(12) United States Patent
Li

(10) Patent No.: US 9,881,097 B2
(45) Date of Patent: Jan. 30, 2018

(54) SYSTEMS AND METHODS FOR CONTACTING TARGET PERSON

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 383 days.

(21) Appl. No.: 14/499,213

(22) Filed: Sep. 28, 2014

(65) Prior Publication Data

US 2016/0092588 A1    Mar. 31, 2016

(51) Int. Cl.
*G06F 17/30* (2006.01)
*G06Q 30/02* (2012.01)
*G06F 21/60* (2013.01)

(52) U.S. Cl.
CPC .. *G06F 17/30876* (2013.01); *G06F 17/30345* (2013.01); *G06F 17/30595* (2013.01); *G06F 21/60* (2013.01); *G06Q 30/0203* (2013.01)

(58) Field of Classification Search
CPC ............. G06F 17/30345; G06F 3/0482; G06F 3/04842; G06Q 30/0203; G06Q 10/101; G06Q 50/01; G09B 7/00; G06B 10/103
See application file for complete search history.

(56) References Cited

U.S. PATENT DOCUMENTS

| | | | | |
|---|---|---|---|---|
| 7,596,597 B2* | 9/2009 | Liu | ........................ | H04L 67/306 709/204 |
| 8,837,466 B2* | 9/2014 | Altberg | .............. | G06Q 30/0241 370/356 |
| 2007/0245245 A1* | 10/2007 | Blue | .................. | G06F 17/30864 715/739 |
| 2014/0030688 A1* | 1/2014 | Lolli | ........................ | G09B 7/00 434/350 |
| 2015/0051951 A1* | 2/2015 | Cederman-Haysom | | G06Q 30/0203 705/7.32 |
| 2015/0112737 A1* | 4/2015 | Saunders | .............. | G06Q 10/107 705/5 |
| 2016/0042370 A1* | 2/2016 | Ludwig | .............. | G06Q 30/0203 705/7.32 |
| 2017/0032253 A1* | 2/2017 | Maekawa | ................ | G06F 17/30 |

* cited by examiner

*Primary Examiner* — Cheryl Lewis

(57) ABSTRACT

Systems and methods for a requester to contact a target person. A linking path is made to connect a requester with a target person through references. After references along the path recommend the requester one by one, the requester is allowed to contact the target person. To protect privacy, names of references are not released. References may use strength level to quantify their recommendation.

20 Claims, 5 Drawing Sheets

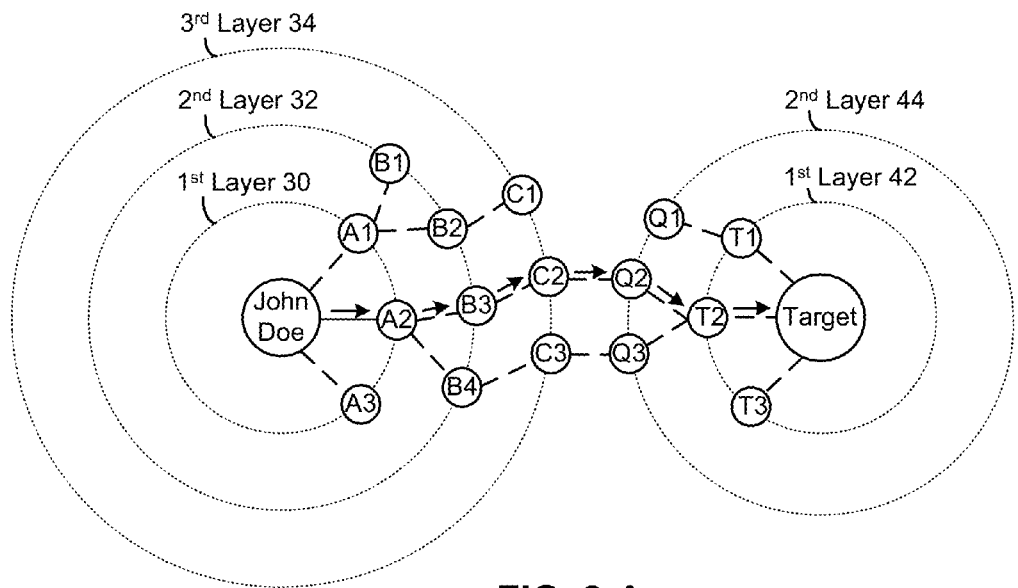
FIG. 3-A
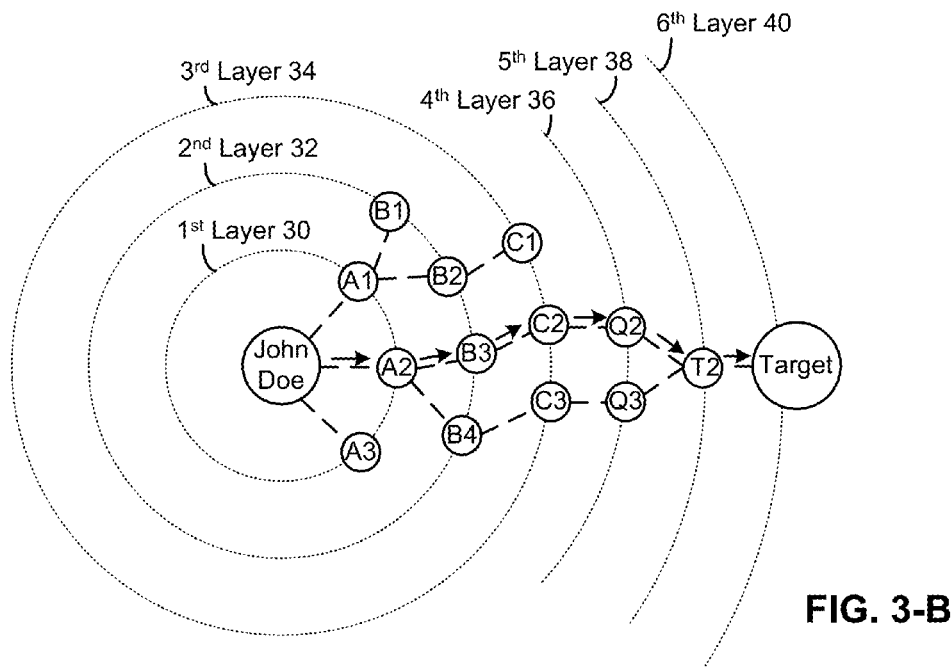
FIG. 3-B

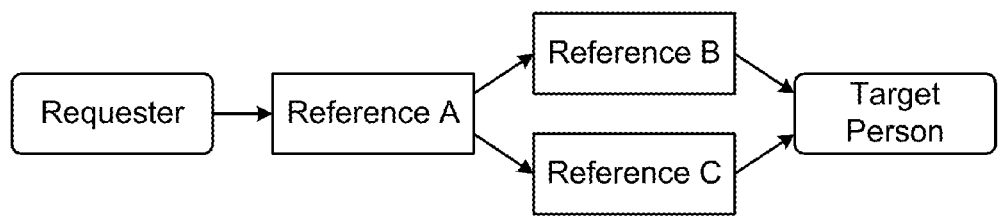
FIG. 5-A
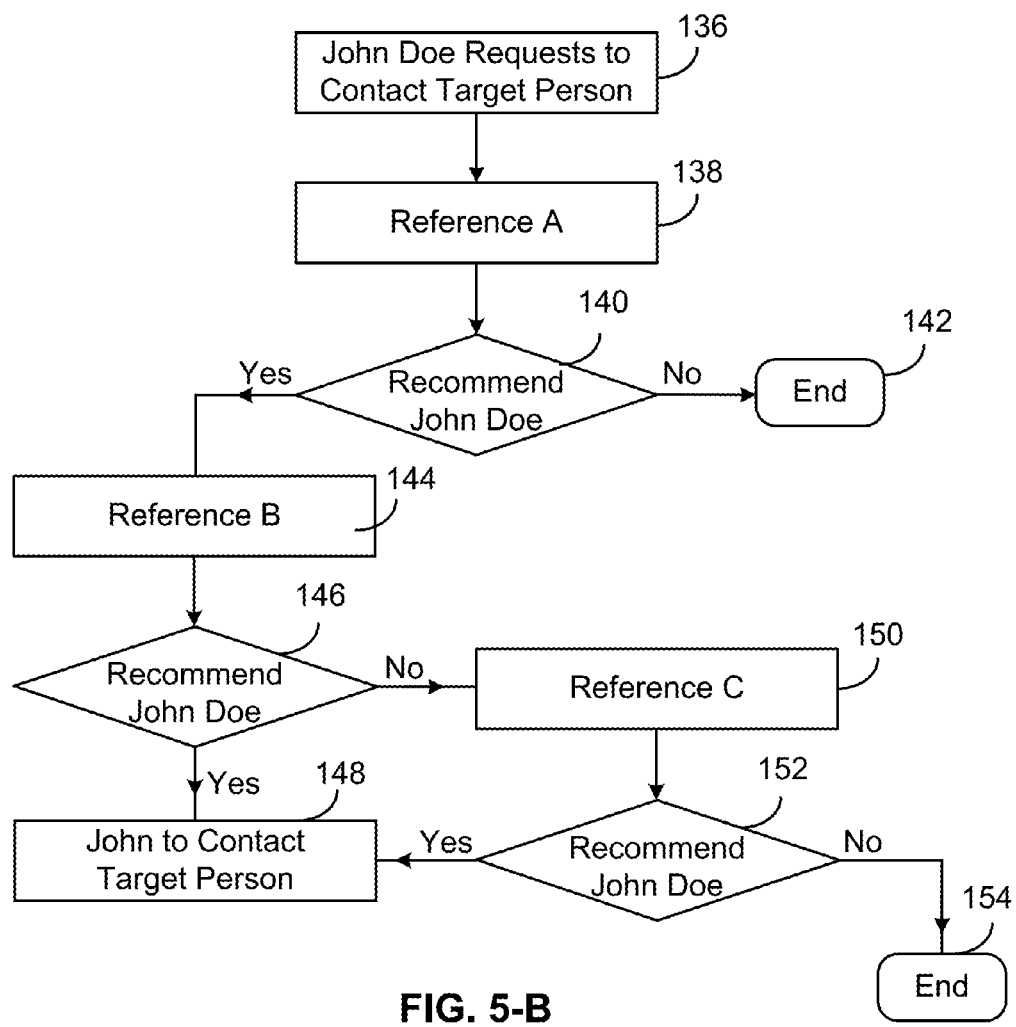
FIG. 5-B

US 9,881,097 B2

SYSTEMS AND METHODS FOR CONTACTING TARGET PERSON

CROSS REFERENCE TO RELATED APPLICATION

This application is entitled to the benefit of Provisional Patent Application Ser. No. 61/890,187, filed Oct. 12, 2013.

FEDERALLY SPONSORED RESEARCH

Not applicable

SEQUENCE LISTING OR PROGRAM

Not applicable

BACKGROUND

Field of Invention

This invention relates to contacting a target person, more particularly to contacting a target person via known and unknown references.

Description of Prior Art

People's connections are very important in both private and business world. As it is said, in a lot of occasions, the person you know may be more important than what you know. But the reality is we have our own social circles that provide only limited social contacts. One way to find more connections is to know friends' friends. We could ask our friends to introduce us to another circle; or as enabled nowadays, we may be able to see our friend's contacts at some social networking websites. But asking a friend for his or her friends is inconvenient and may cause awkward or even unpleasant situation. Letting others, even friends, to view own contacts might be equally awkward and uneasy, let alone privacy concerns.

Therefore, there exists a need to contact friend's friend in a way that is less uneasy and protects privacy in the meantime.

A person's direct contact may be called first layer reference, with one degree of separation as known in the field. Friend's direct contact may be called second layer reference, with two degrees of separation. Current method to contact a target person relies on friends and friend's friends, assuming he or she happens to be the contact of either friend or friend's friend. In practice as available at some social networking websites, a contact of friend's friend is the farthest a requester could go because of privacy and trust issues. So any target person in the fourth, fifth, or higher layer would become out of reach. Thus, the availability of target person is limited by the first and second layer references of a requester.

Therefore, there exists a need to make more target persons available for a requester to connect with.

Objects and Advantages

Accordingly, several main objects and advantages of the present invention are:

a). to provide an improved system and method for a requester to contact a target person;
b). to provide such a system and method which protect the privacy of a friend or reference;
c). to provide such a system and method which doesn't release names of a contact's connections;
d). to provide such a system and method which doesn't release to a requester the name of a reference who makes recommendation;
e). to provide such a system and method which connect a requester to a target person via a reference path invisible to the requester, target person, and references;
f). to provide such a system and method which arrange a reference to recommend an unknown requester using recommendation record made by other references; and
g). to provide such a system and method which enable a reference to make recommendation with strength level.

Further objects and advantages will become apparent from a consideration of the drawings and ensuing description.

SUMMARY

In accordance with the present invention, a method is proposed to help a requester contact a target person. First, references are selected to link a requester to a target person. Then references are arranged to recommend the requester consecutively. A reference may recommend an unknown requester based on recommendation record made by other references. The requester may be connected to the target person if all selected references make recommendation. To protect privacy, names of a friend's contacts are not shared. Names of the selected references are not shared either. Moreover, a reference may choose a recommendation strength level to produce a quantitative indicator. The method makes more target persons available and protects the privacy of references.

DRAWING FIGURES

FIGS. 3-A and 3-B are illustrations showing exemplary paths linking a requester with a target person via references in accordance with the present invention.

Figure 4:
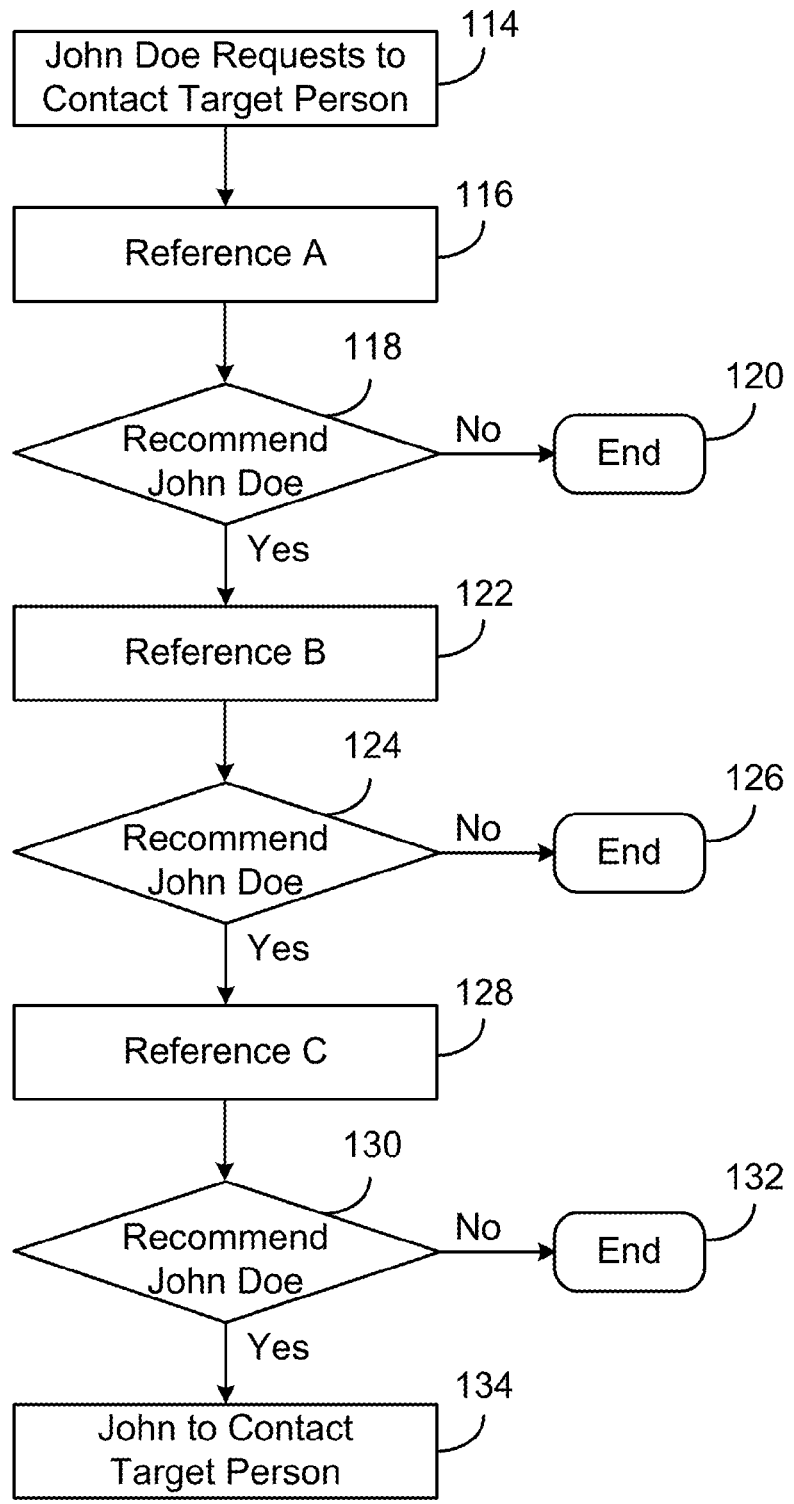

FIG. 4 is a flow diagram showing one embodiment to connect a requester to a target person in accordance with the present invention.

FIGS. 5-A and 5-B are flow diagrams showing another embodiment to connect a requester to a target person in accordance with the present invention.

Figure 6:
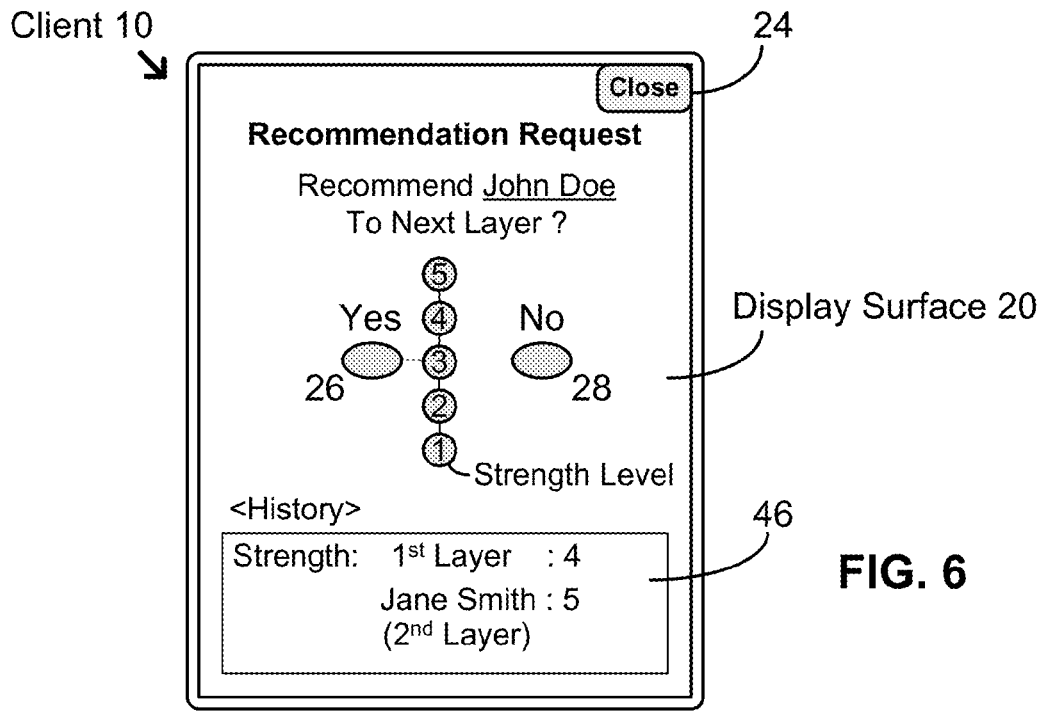
Figure 7:
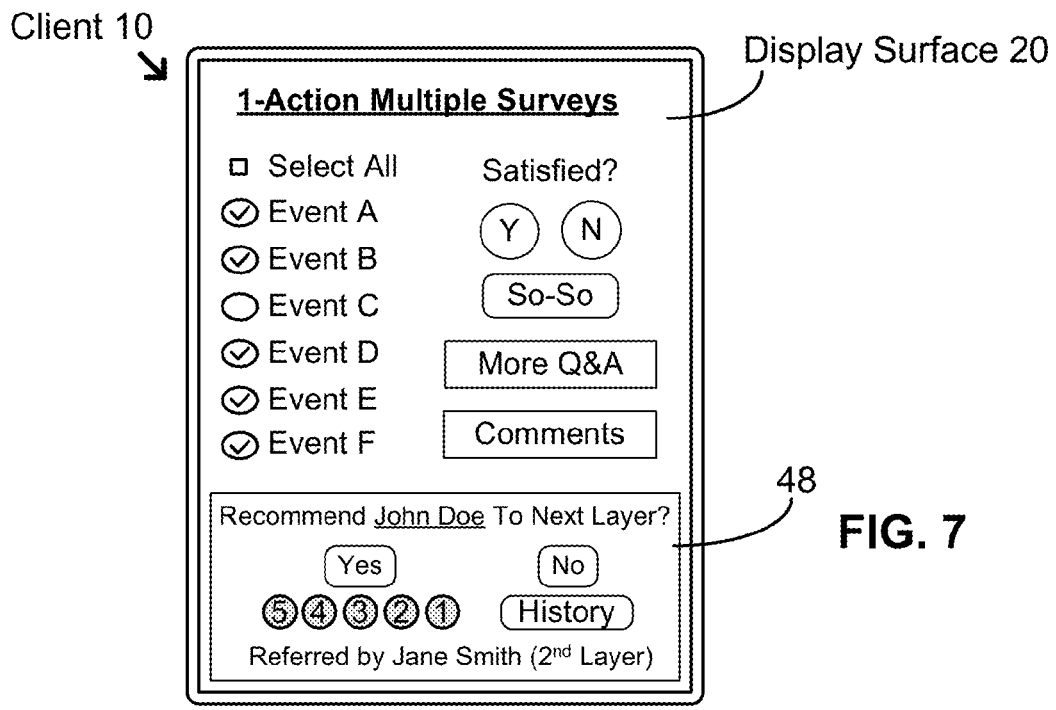

FIGS. 6 and 7 are illustrations of two embodiments for a reference to recommend a requester in accordance with the present invention.

| REFERENCE NUMERALS IN DRAWINGS | |
|---|---|
| 10 | Client System |
| 12 | Database |
| 14 | Communication Network |
| 16 | Processor |
| 18 | Processing Module |
| 20 | Display Surface |
| 22 | Computer Readable Medium |
| 24 | Button |
| 26 | Button |
| 28 | Button |
| 30 | Reference Layer |
| 32 | Reference Layer |
| 34 | Reference Layer |
| 36 | Reference Layer |

REFERENCE NUMERALS IN DRAWINGS

| | |
|---|---|
| 38 | Reference Layer |
| 40 | Reference Layer |
| 42 | Reference Layer |
| 44 | Reference Layer |
| 46 | Window |
| 48 | Window |
| 80 | Client System |
| 82 | Server System |
| 100, 102, 104, 106, 108, 110, 112, 114, 116, 118, 120, 122, 124, 126, 128, 130, 132, 134, 136, 138, 140, 142, 144, 146, 148, 150, 152, and 154 are exemplary steps. | |

DETAILED DESCRIPTION

Figure 1:
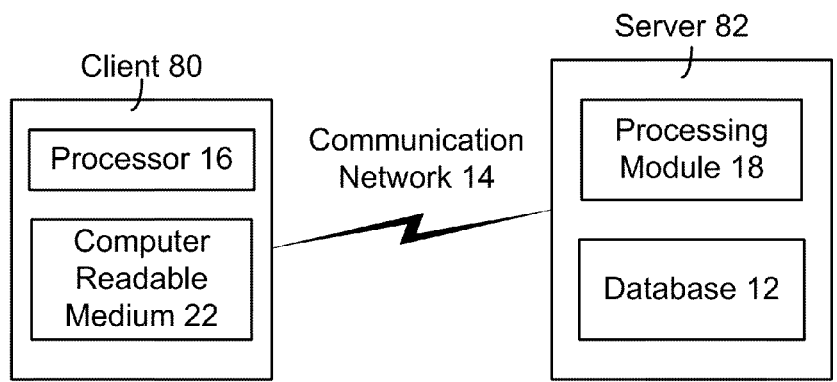
FIG. 1 is a block diagram describing one embodiment in accordance with the present invention.

FIG. 1 is an exemplary block diagram of one embodiment according to the present invention. A client system 80 and server system 82 are connected via a communication network 14. Client 80 may represent an electronic device, including but not limited to a smartphone, a smart watch, a tablet computer, a handheld computer, a desktop computer, etc. Client 80 may include a processor 16 and computer readable medium 22. Processor 16 may mean one or more processor chips or systems. Medium 22 may include a memory hierarchy built by one or more memory chips or storage modules like RAM, ROM, FLASH, magnetic, optical and/or thermal storage devices. Processor 16 may run programs or sets of executable instructions stored in medium 22 for performing various functions and tasks, e.g., surfing on the Internet, playing video or music, electronic payment, social networking, sending and receiving messages, executing other applications, etc. Client 80 may also include input, output, and communication components, which may be individual modules or integrated with processor 16. Usually, client 80 may have a display with a graphical user interface (GUI). A user may use GUI to interact with a client system and/or a remote server. A display surface may be sensitive to touches, i.e., sensitive to haptic and/or tactile contact with a user, especially in the case of smart phone, smart watch, and tablet computer. A touch screen may be used as a convenient tool for a user to enter input. Client 80 may also have a voice recognition component for receiving a verbal command or audio input from a user.

The word "server" means a system or systems which may have similar functions and capacities as one or more servers. Main components of server may include one or more processors, which control and process data and information by executing software, logic, code, or carrying out any other suitable functions. A server, as a computing device, may include any hardware, firmware, software, or a combination. In the most compact form, a server may be built on a single processor chip. In the figure, server 82 may represent one or more server entities that collect, process, maintain, and/or manage user (requester, reference, and target person) information, arrange process to connect requester to target person, communicate with users, deliver information required by users or customers, etc. Server 82 may exemplarily be divided into two blocks, represented by a processing module 18 and a database 12. Processing module 18 may include processing and communication functions. Database 12 may store user information such as user ID, user contact info, user resume, info of previous connecting and recommendation process and results, and other relevant information. The database may include aforementioned memory chips and/or storage modules.

A communication network 14 may cover a range of entities such as the Internet or the World Wide Web, a local area network (LAN), a wide area network (WAN), a metropolitan area network (MAN), a telephone network, an intranet, wireless, and other types of networks. Client 80 and server 82 may be connected to network 14 by various wired, wireless, optical, or other connections.

Figure 2:
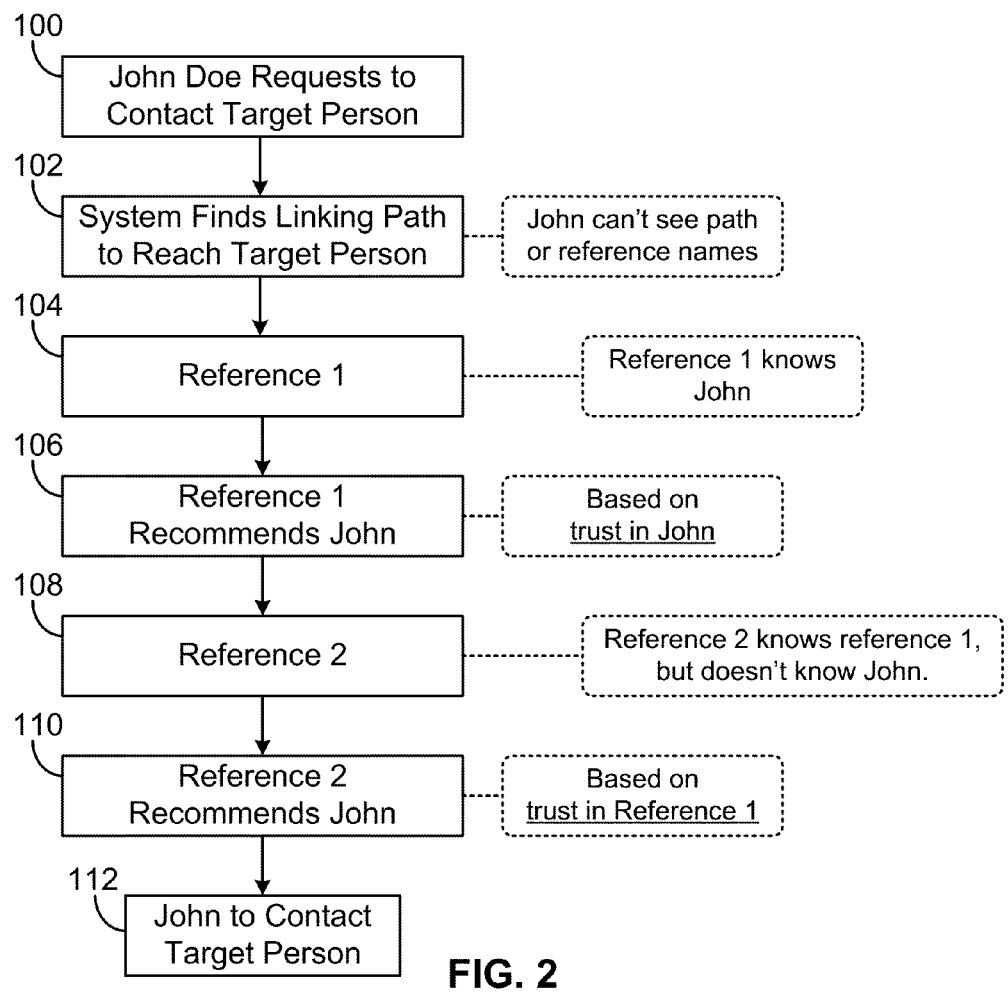
FIG. 2 is a flow diagram showing exemplary steps to connect a requester to a target person in accordance with the present invention.

FIG. 2 depicts a schematic flow diagram to connect a requester to a target person according to the present invention. Assume that John Doe requests to contact a target person in Step 100. The request is submitted to a reference system. In Step 102, resumes of John and the target person are obtained and analyzed. Contacts or direct connections of these two persons are found, and so are contacts of friend and contacts of friend's friends. Assume that reference 1 and reference 2 are the contacts of John and the target respectively, and they are directly connected. Thus the system may build a linking path from John to the target via the two references. To protect privacy and prevent embarrassment from happening, names of relevant references are not released to John and the target.

Next in Step 104, reference 1 is asked to recommend John to the next layer. Reference 1 may or may not know the name of the target person, depending upon the system design and user setup. As a contact or direct connection, reference 1 knows John, and also knows his or her recommendation would help John contact someone. In Step 106, reference 1 submits recommendation to the system, which may be based on the trust in John as a result of being friends or acquaintance for some time. Then according to the linking path, reference 2 is approached in Step 108. Reference 2 knows reference 1 and reference 1's recommendation decision, but has no knowledge of John. Because reference 2 has confidence in reference 1, another recommendation is made in Step 110. As the target is in the next layer, all necessary procedures are completed. The system may allow John to contact the target in Step 112. John may send a short message or email to the target. The message or email may be sent to the system which then passes it to the target, or John may get a temporary email address for one-time use.

Above connecting process is not limited to two references. As a reference doesn't need to know a requester to recommend him or her, there is no factor limiting the number of references between a requester and target. Many layers of references may be arranged for connecting purpose. Therefore, more target persons may become available for contact comparing to the current practice. During the process, a requester doesn't know any references involved, a reference doesn't know another reference in the next layer, and neither a reference nor a target person knows the names of reference more than a layer apart. Thus references may have less privacy concerns when making a decision, and any decision made may not cause uneasiness or embarrassment in the future.

FIG. 3-A shows a schematic diagram which describes a connecting embodiment using references of many layers. Assume again that John Doe wants to contact a target person. John doesn't have the contact info of target person, so he wants to use his connections and connections' of connections to reach the target. In the figure, a circle of dotted line represents a reference layer, and a dash line means a direct connection exists between two persons at its ends. It shows that John has a first reference layer 30, a second reference layer 32, and a third reference layer 34, while the target person has a first reference layer 42 and a second reference layer 44. John has first-layer connections A1, A2, and A3; second-layer connections B1, B2, B3, and B4; and third-layer connections C1, C2, and C3. The target has first-layer connections T1, T2, and T3, and second-layer connections Q1, Q2, and Q3. Reference layers are connected by contact, for instance, B1 and B2 are of contacts of A1, Q2 and Q3 are of contacts of T2, and C2 is of contact of Q2, etc. References of the same layer may be of contacts too, though not shown in the figure for the purpose of simplicity.

Currently some social networking system may allow John to see contacts of direct connections, i.e., John may view the second layer people or references B1, B2, B3, and B4. And John may have a chance to contact third layer people or reference C1, C2, and C3. But John can't go beyond the third layer. In other words, John can't get help from the system to contact the target. Obviously this method has two major issues: Privacy and connecting power. A requester may benefit from seeing the second layer people. But the first layer people may not be willing to expose his or her connections. And for the third layer people, exposing personal info to an unknown may cause uneasiness and worry, since naturally, a person may trust his friends, but not necessarily a friend's friend. On the other hand, there are indeed a limited number of people in the third layer for many requesters, and those may represent the final resource for them.

To reduce privacy concerns, the proposed method doesn't release contacts of connections, or a requester can't see things beyond the first layer. While a requester can't figure out a path to reach a target, a reference system may manage to do so. For instance in FIG. 3-A, the system may be designed to find out whether a reference from John's side is a contact of a reference from the target side by certain algorithm or computer program. It then discovers that C2 and Q2 are contact to each other, and so are C3 and Q3. Thus two paths may be made to link the requester to the target, John-A2-B3-C2-Q2-T2-Target, and John-A2-B4-C3-Q3-T2-Target, where any two neighboring persons are contact persons connected directly. Again to protect privacy, the path and names of people or references along the path are not released to the requester, which also reduces pressure on participating references. A reference or target person may know the name of a requester and another reference who is in the previous layer, but not names of other references.

In the next stage, the system may ask A2 whether A2 wants to recommend John to the next layer, and then ask B3 whether to recommend John, a friend's friend, to the next layer, the third layer, and then C2, Q2, and T2 would be asked the same question. If all the selected references answer yes, John will be enabled to contact the target. For instance, John may receive a temporary email address of the target. If John submits a message already, the message may be sent to the target by the system.

It is noted that the scheme relies on trust between references, not between a requester and a reference. After all, only A2, as a contact of a requester, knows the requester and acts on the trust in the requester. For other references, a recommendation decision is based on the trust in his or her contact and contact's contact. It's like if my trusted friend says a person is okay, the person may be okay. Besides, a reference won't worry about leaking out any personal info, or being confronted with an unhappy requester, as a requester wouldn't know who takes part in the process. It is seen that there is no limit for the number of reference layers. Thus the chance of finding and contacting a target person is greatly increased.

FIG. 3-B shows the same event as that of FIG. 3-A from a different viewpoint. Since a target person is connected to a requester through references, he or she may be considered as the requester's reference too, or as an indirect connection. The configuration of FIG. 3-A may be converted to the diagram in FIG. 3-B, where Q2 and Q3 reside in a fourth layer 36 of requester, T2 in a fifth layer 38, and the target in a sixth layer 40. Thus once it is determined that a target person is connected to a requester via references, contacting a target may become contacting a reference in a certain layer. In FIG. 3-A, in order to link to a target, it is needed to see whether there are two references from both sides that are contacts to each other; while in FIG. 3-B, the task is to check whether a target person is actually a reference in certain reference layer of a requester. In both settings, many references may be dug out to see whether there is a match, which is laborious for people but suitable for computers or servers with given algorithm. When it is confirmed that a target is linked to a requester via certain references, the references may form a line from the requester to the target. Any person on the line or along the line is a contact of another person, and any reference along the line is the contact of two persons close by. To link a requester with a target, the key issue is of finding a linking reference path, and getting references to recommend.

As seen in FIG. 3-A or 3-B, there are two paths leading to the target. If it happens that B3, C2, or Q2 refuses to recommend the requester, the system may be designed to switch to the second path. Then B4, C3, Q3, and T2 may be arranged to do recommendation procedures. If it succeeds at the second path, the requester will be allowed to contact the target.

FIG. 4 illustrates an exemplary flow diagram of an embodiment in accordance with the present invention. The diagram describes a process to connect a requester to a target person. In Step 114, a remote system receives John Doe's request to contact a target person. John doesn't know the person, but hopes his friends or friend's friends may know him. The system is assumed to have a talent database which stores information of a great number of members or users. The system may analyze information related to John and the target person, and then construct or retrieve, if available, the first reference layer, second reference layer, and possibly more reference layers of these two persons. The system, using certain algorithm, may compare names from two sides and seek whether there is reference belonging to both sides. Once a common reference is found, a path from John to the target may be arranged. To avoid errors caused by the duplicate name of two people, proper identification measures should be taken.

Having made a connection path, which is invisible to John, references, or the target, the next stage is to get recommendation or endorsement from references involved. Starting from the requester side of the path, the first person is reference A. In Step 116, reference A is reached by the system and a session is arranged and conducted. If reference A refuses to recommend John in Step 118, the process stops in Step 120. Then another path, if available, may be used to get John connected to the target. If the answer from reference A is yes, the process proceeds to the next reference, reference B in Step 122. Next, another recommendation session is prepared in Step 124. If reference B doesn't want to recommend the requester, the process aborts in Step 126. If the answer is yes, the process moves one step ahead to reach reference C in Step 128. Assume reference C is the last link before the target person, a decision in Step 130 determines whether John gets his wish. It may end in Step 132 if reference C objects to recommending John. If reference C gives recommendation, the system sends John contact info of target, which may be a one-time use email address. Finally, John may contact the target in Step 134 by email or short message.

In the whole process, the connection path remains hidden or invisible to all parties. John isn't aware of participation of any references, and a reference only knows another reference one layer lower. For example, reference C only knows reference B is involved in the process, because it is reference B who recommends John to him or her. Thus John's desire may be satisfied, while people involved are protected from privacy exposure, awkward moment, or embarrassment resulting from recommendation decisions.

A recommendation may come with weight or strength level. In real life, we tend to trust our friend, not so for friend's friend, and even less so for friend of friend's friend. Thus it may create a dilemma when there are more than one layer between a requester and a target person. In above discussions, a reference may know the number of layers a requester has gone through. But the answer has only two levels: Yes or no, which may not provide enough info for the rest references. Therefore, if a recommendation carries weight or strength level, it may give additional info to other references. Since a reference of a second layer or higher layer may not know a requester, the recommendation strength in fact is a grade to show trust in another reference, not the requester. For instance in FIG. 4, recommendation strength given by reference B means how much he trusts reference A, instead of John. Assume the strength has five levels, marked by one to five. A reference may see recommendation strength level given in each layer. The strength level may help a reference decide whether to recommend or not. The strength level may also influence a target person, when he or she decides whether to read a message from an unknown requester.

Back to FIG. 1, a recommendation session arranged for a reference or a user may be administered by processor 16. Preparation of the session by the client system may be triggered by an instruction transmitted from server 82 at a reference center. After a recommendation event, related information, including case ID, requester ID, reference ID, reference decision, may be sent to server 82 by processor 16 via network 14. Server 82 may store the information and result at database 12. Alternatively, processor 16 may send the information and data to a local device which may then pass them to server 82.

Now referring to FIGS. 5-A and 5-B, where two exemplary flow diagrams of an embodiment are illustrated. FIG. 5-A shows the basic scheme. A requester is linked to a target by two paths, requester-A-B-target and requester-A-C-target. To connect the requester to the target, assume that the A-B path is tried first. In case reference B doesn't like to recommend the requester, the A-C path may be used and reference C would be asked for recommendation. The requester doesn't know that references A, B, C are the participants, nor does requester know reference B declines to recommend. Thus references may have less concern over expressing true feeling. In the meantime, resources of a requester are designed to be utilized effectively. For further discussion, FIG. 5-B depicts more details to elaborate the process in a flow diagram.

In Step 136, John Doe files a request to contact a target person. The system then gathers information of John and the target person after analyzing their resumes and examining related info from other sources. Next a reference path linking the two via references may be produced. In Step 138, a session is set up for the first reference, reference A, with a recommendation request. Reference A makes a decision in Step 140. A no answer may end the process in Step 142. If the reply is yes, the next reference, reference B is approached in Step 144. Reference B may see that reference A has made a recommendation for the requester. But reference B can't see the names of reference C and the target. Reference B decides whether to recommend in Step 146. If recommendation is granted, the system may enable John to contact the target in Step 148. But if reference B shuns away from recommending John, the system may automatically switch path by replacing reference B and using reference C in Step 150, as it knows there are two paths. Now it's up to reference C to move ahead in Step 152. Reference C may see the name of reference A, as reference A resides in one layer below, but has no knowledge of reference B and the target person. If reference C doesn't recommend the requester either, it ends in step 154. If reference C gives yes answer, the system may release relevant info to enable John to contact the target person in Step 148.

FIG. 6 illustrates schematically an embodiment for a reference to recommend a requester. A client 10 may be a smart phone or computer. It shows a recommendation window on a surface 20. The display surface may be made touch sensitive. Thus buttons displayed may be activated by click or tap of fingertip. The window may show up after a program or application is launched. A session is arranged for a reference to recommend requester John Doe. The title in the window says "Recommendation Request". A question "Recommend John Doe To Next Layer?" is posted below the title. There are two answer buttons 26 and 28 representing yes and no. Associated to yes button are five number buttons representing one to five. A reference may select button 26 "Yes" or one of the number buttons to quantify a yes answer. A quantitative answer may be used as recommendation strength level, which may help following references make their decision. Number 5 represents the highest strength level. If a reference is busy, he or she may tap a "Close" button 24 to close the window or temporarily conclude the event. The window may be configured to close by itself in a certain period of time in the absence of activity. Further down in the window, there is another window area 46 with a "History" title. History means recommendation record made by other references. It may display the previous reference layers and strength level in each layer. For instance in the figure, first layer reference gives number 4, while the second layer reference issues number 5. As a reminder, recommendation strength level of the first layer indicates the trust in the requester, and the strength level of other layers means the trust in a reference one layer below. The figure shows that a reference may see recommendation strength level given in all previous layers, but can only see the name of one reference, Jane Smith, who is one layer apart and is a contact. It is seen that the target person and a reference in a higher layer are not disclosed either. Again, when the reference makes recommendation, it shows trust in Jane Smith, who is a direct connection, not John.

A recommendation process may be made simple and quick, as discussed above. But as the event is designed to benefit a requester, a reference may lack incentive to do it. Thus besides easy-to-do process, convenience and timing are also important. When a reference is watching contents on a display, appearance of recommendation program may draw annoyance. However, when a reference is not watching contents presented, he or she may watch something else away from the display. In either case, it's hard to introduce a recommendation session.

To resolve the dilemma, FIG. 7 schematically shows another embodiment, where the main theme is "1-Action Multiple Surveys" on surface 20 of client 10. The multiple surveys may be configured for getting feedback on regular daily activities, such as shopping, dining, service, entertainment, etc. A person may periodically visit the webpage to complete surveys and possibly collect points as award. Once a person is done with these routine surveys, he may take one more "survey" to recommend a requester. As shown at the bottom part of surface 20, there is a window area 48 which is set up for recommending John Doe. The survey contents are the same as that in FIG. 6, i.e., the same question "Recommend John Doe To Next Layer?" and same answer buttons. A reference may see who recommends the requester to him or her right away. If button "History" is tapped, another window may pop up to show more info like strength level in each previous layer, and additional info of John Doe.

The configuration in FIG. 7 makes a recommendation process far less intrusive, as it occurs on an opinion-gathering page and follows other opinion-submission events. In addition, after a person takes surveys on daily events, he or she may have a little free time on hand, and thus may be more likely to do another quick act.

Conclusion, Ramifications, and Scope

Thus it can be seen that systems and methods are introduced to help a requester contacting a target person.

The improved method has the following features and advantages:

(1). A requester can't see names of a friend's friends;
(2). A requester can't see name of a reference who is in a recommendation process.
(3). A reference may recommend an unknown requester based on recommendation by other references;
(4). References and target person can't see names of other references except a reference one layer below; and
(5). A reference may recommend a requester with recommendation strength level, which may help other references make decisions.

Although the description above contains many specificities, these should not be construed as limiting the scope of the invention but as merely providing illustrations of some of the presently preferred embodiments. Numerous modifications will be obvious to those skilled in the art.

Ramifications:

Recommendation process as described in FIG. 6 may be designed to have one-click function, i.e., one click or tap on an answer button, such as button yes, no, or strength level button, may complete the process and close the survey window.

Using voice recognition technology, a client device may recognize a user's voice. A user may use his or her voice to give a short answer like yes, no, or yes with a number as strength level, which may be more convenient for some users in certain situation.

In aforementioned embodiments, John Doe may submit a name as the person he would like to contact. But in some cases, John may not know the exact name of a target person. For instance, John wants to introduce a product to a company. He knows the procurement department is in charge of evaluating new items. So what John needs is to contact any person at that department. In such a case, John may request contact info of a group or organization. John may submit a target name as "procurement department at company ABC". The system may then dig out names at the department and select one for recommendation process.

To provide convenience for a reference, a requester info button may be placed in a recommendation window. The button may lead to a webpage where detailed info of a requester is presented.

For easier comprehension, a question prepared for recommendation request is made short and simple. Subject, verb, or other parts of a normal sentence may be omitted if doing so makes it more concise. For instance, the subject in "Recommend John Doe To Next Level?" is omitted in FIGS. 6 and 7. And a request question may be arranged with the same format and structure where the only changeable part is a requester's name. Such an arrangement helps present a recommendation session with a familiar scene, which in turn helps references grab a question quickly and easily.

Therefore the scope of the invention should be determined by the appended claims and their legal equivalents, rather than by the examples given.

The invention claimed is:

1. A computer implemented method for connecting a requester and a target person, the method comprising:
   executing, by a processor, instructions stored in an apparatus, the instructions for performing the following steps:
   1) receiving a request to contact said target person from said requester at said processor;
   2) obtaining information of said requester, said information including users who are directly or indirectly connected to said requester;
   3) ascertaining whether one of the users is said target person;
   4) determining a plurality of reference layers between said requester and said target person and selecting a plurality of said users as references after the ascertaining step gives a positive answer, wherein each of the reference layers has one of the references only and exclusively and any two of the references at neighboring reference layers are connected directly;
   5) providing an option for each of the references to recommend said requester;
   6) the method arranged such that names of the references remain inaccessible to said requester, and each of the references only has access to name of another reference who is the latest to recommend said requester; and
   7) enabling said requester to contact said target person or providing said requester with contact info of said target person when each of the references recommends said requester.

2. The method according to claim 1, wherein the instructions are further configured to replace one of the references when the one of the references doesn't recommend said requester.

3. The method according to claim 1, wherein one of the references is arranged to recommend said requester based on recommendation record made by another of the references previously.

4. The method according to claim 1, wherein the instructions are further configured to provide a second mechanism for one of the references to express recommendation strength.

5. The method according to claim 1, wherein said option is presented in a survey interface.

6. The method according to claim 1, wherein number of the reference layers is larger than two.

7. The method according to claim 1, wherein the instructions are further configured to present in an interface recommendation strength made by one of the references.

8. A computer implemented method for connecting a requester and a target person, the method comprising:
   executing, by a processor, instructions stored in an apparatus, the instructions for performing the following steps:

1) receiving a request to contact said target person from said requester at said processor;
2) obtaining information of said requester and ascertaining whether said target person is connected to said requester indirectly;
3) determining a plurality of reference layers between said requestor and said target person and selecting a plurality of references after the ascertaining step gives a positive answer, wherein each of the reference layers has one of the references only and exclusively and any two of the references at neighboring reference layers are connected directly;
4) providing an option for each of the references to recommend said requester;
5) the method arranged such that names of the references remain inaccessible to said requester and one reference only has access to name of another reference who is the latest to recommend said requester; and
6) enabling said requester to contact said target person or providing said requester with contact info of said target person when the references each recommend said requester.

9. The method according to claim 8, wherein the instructions are further configured to replace one of the references when the one of the references doesn't recommend said requester.

10. The method according to claim 8, wherein one of the references is arranged to recommend said requester based on recommendation record made by another of the references previously.

11. The method according to claim 8, wherein the instructions are further configured to provide a second mechanism for one of the references to express recommendation strength.

12. The method according to claim 8, wherein said option is presented in a survey interface.

13. The method according to claim 8 wherein number of the reference layers is larger than two.

14. The method according to claim 8, wherein the instructions are further configured to present in an interface recommendation strength made by one of the references.

15. A computer implemented method for connecting a requester and a target person, the method comprising:
executing, by a processor, instructions stored in an apparatus, the instructions for performing the following steps:

1) receiving a request to contact said target person from said requester at said processor;
2) obtaining information of said requester and said target person and ascertaining whether there is a user who is connected to said requester and said target person respectively;
3) determining a plurality of reference layers between said requester and said user and between said target person and said user after the ascertaining step gives a positive answer;
4) selecting a plurality of references;
5) each of the reference layers arranged to have one of the references only and exclusively and two of the references or one of the references and the user at neighboring reference layers connected directly;
6) presenting an option for the user and the references to decide whether to recommend said requester;
7) the method arranged such that names of the user and the references remain inaccessible to said requester and one reference only has access to name of the user or another reference who is the latest to recommend said requester; and
8) enabling said requester to contact to said target person or providing said requester with contact info of said target person when the user and the references each recommend said requester.

16. The method according to claim 15, wherein the instructions are further configured to replace one of the references when the one of the references doesn't recommend said requester.

17. The method according to claim 15, wherein the instructions are further configured to provide a second mechanism for one of the references to express recommendation strength.

18. The method according to claim 15, wherein said option is presented in a survey interface.

19. The method according to claim 15, wherein number of the reference layers is larger than two.

20. The method according to claim 15, wherein the instructions are further configured to present in an interface recommendation strength made by one of the references previously.

* * * * *